United States Patent
Tessarolo

(10) Patent No.: US 7,580,968 B2
(45) Date of Patent: Aug. 25, 2009

(54) PROCESSOR WITH SCALED SUM-OF-PRODUCT INSTRUCTIONS

(75) Inventor: Alexander Tessarolo, Sydney (AU)

(73) Assignee: Texas Instruments Incorporated, Dallas, TX (US)

( * ) Notice: Subject to any disclaimer, the term of this patent is extended or adjusted under 35 U.S.C. 154(b) by 537 days.

(21) Appl. No.: 10/349,344

(22) Filed: Jan. 22, 2003

(65) Prior Publication Data

US 2003/0163500 A1  Aug. 28, 2003

Related U.S. Application Data

(60) Provisional application No. 60/360,922, filed on Feb. 28, 2002.

(51) Int. Cl.
*G06F 7/38* (2006.01)
(52) U.S. Cl. .................. 708/603
(58) Field of Classification Search ........... 708/603
See application file for complete search history.

(56) References Cited

U.S. PATENT DOCUMENTS

| 5,764,557 A * | 6/1998 | Hara et al. ............ 708/603 |
| 6,233,596 B1 * | 5/2001 | Kubota et al. ........ 708/603 |
| 6,370,558 B1 * | 4/2002 | Guttag et al. ........ 708/603 |
| 6,496,920 B1 * | 12/2002 | Zou et al. ............ 712/33 |
| 6,581,086 B1 * | 6/2003 | Morrison et al. ..... 708/523 |

OTHER PUBLICATIONS

TMS320C28X DSP CPU and Instruction Set Reference Guide, Aug. 2001, pp. 1-695, Texas Instruments, Inc., U.S.A.

* cited by examiner

*Primary Examiner*—David H Malzahn
(74) *Attorney, Agent, or Firm*—Robert D. Marshall, Jr.; Wade J. Brady, III; Frederick J. Telecky, Jr.

(57) ABSTRACT

A method of performing a scaled sum-of-product operation in a processor in response to multiply-and-accumulate (MAC) instructions. The method includes accessing a first number, accessing a second number, and accessing a shift value. The first number is multiplied by the second number, the resulting product comprising a third number that includes a most significant portion and a least significant portion. The method includes executing a first MAC instruction, executing a second MAC instruction, and storing a final result of the scaled sum-of-product operation. Executing the first MAC instruction comprises right-shifting the least significant portion of the third number according to the shift value; accessing a least significant portion of a fourth number; and adding the right-shifted least significant portion of the third number to the least significant portion of the fourth number, the resulting sum comprising a least significant portion of the final result of the scaled sum-of-product operation.

6 Claims, 2 Drawing Sheets

PROCESSOR WITH SCALED SUM-OF-PRODUCT INSTRUCTIONS

This application claims priority under 35 USC §119(e)(1) of Provisional Application No. 60/360,922, Feb. 28, 2002.

TECHNICAL FIELD OF THE INVENTION

This invention relates generally to processor operations and more particularly to 64-bit scaled sum-of-product operations in a 32-bit environment.

BACKGROUND OF THE INVENTION

There are drawbacks associated with traditional 64-bit scaled sum-of-product operations. In traditional 64-bit scaled sum-of-product operations, scaling operations and sum-of-product operations may need to be performed separately, which may increase the number of instructions needed for such operations (and, therefore, the number of cycles associated with executing such operations). Other traditional 64-bit scaled sum-of-product operations may require 64-bit adders and 64-bit registers (or 32-bit register pairs) or, where such adders are unavailable, multiple microcycles using 32-bit adders. Such operations may, however, decrease silicon efficiency, adversely affect processor performance, or both.

SUMMARY OF THE INVENTION

Particular embodiments of the present invention may reduce or eliminate disadvantages and problems traditionally associated with 64-bit scaled sum-of-product operations in 32-bit environments.

In one embodiment of the present invention, logic for performing 64-bit scaled sum-of-product operations in a 32-bit environment accesses a first 32-bit number, a second 32-bit number, and a shift number in a first operation. The logic multiplies the first 32-bit number by the second 32-bit number. The resulting product includes a first 64-bit number that includes a most significant 32-bit portion and a least significant 32-bit portion. The logic right-shifts the least significant 32-bit portion of the first 64-bit number according to the shift number. The logic accesses a least significant 32-bit portion of a second 64-bit number and adds the right-shifted least significant 32-bit portion of the first 64-bit number to the least significant 32-bit portion of the second 64-bit number. The resulting sum includes a least significant 32-bit portion of a final result of a 64-bit scaled sum-of-product operation and further includes a carry bit. The logic stores the least significant 32-bit portion of the final result of the 64-bit scaled sum-of-product operation and stores the carry bit. In a second operation, the logic accesses the first 32-bit number, the second 32-bit number, and the shift number. The logic multiplies the first 32-bit number by the second 32-bit number. The resulting product includes the first 64-bit number. The logic right-shifts the most significant 32-bit portion of the first 64-bit number according to the shift number. The logic access a most significant 32-bit portion of the second 64-bit number and accesses the carry bit. The logic adds the most significant 32-bit portion of the second 64-bit number and the carry bit to the right-shifted most significant 32-bit portion of the first 64-bit number. The resulting sum includes a most significant 32-bit portion of the final result of the 64-bit scaled sum-of-product operation. The logic stores the most significant 32-bit portion of the final result of the 64-bit scaled sum-of-product operation.

Particular embodiments of the present invention may provide one or more technical advantages. Particular embodiments may perform 64-bit scaled sum of product operations in a 32-bit environment. Particular embodiments may perform 64-bit scaled sum of product operations using a 32-bit adder instead of a 64-bit adder. In particular embodiments, scaling operations may be performed in conjunction with sum-of-product operations. Particular embodiments may use less circuitry, decrease time requirements associated with 64-bit scaled sum of product operations, increase silicon efficiency, and improve processor performance. Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
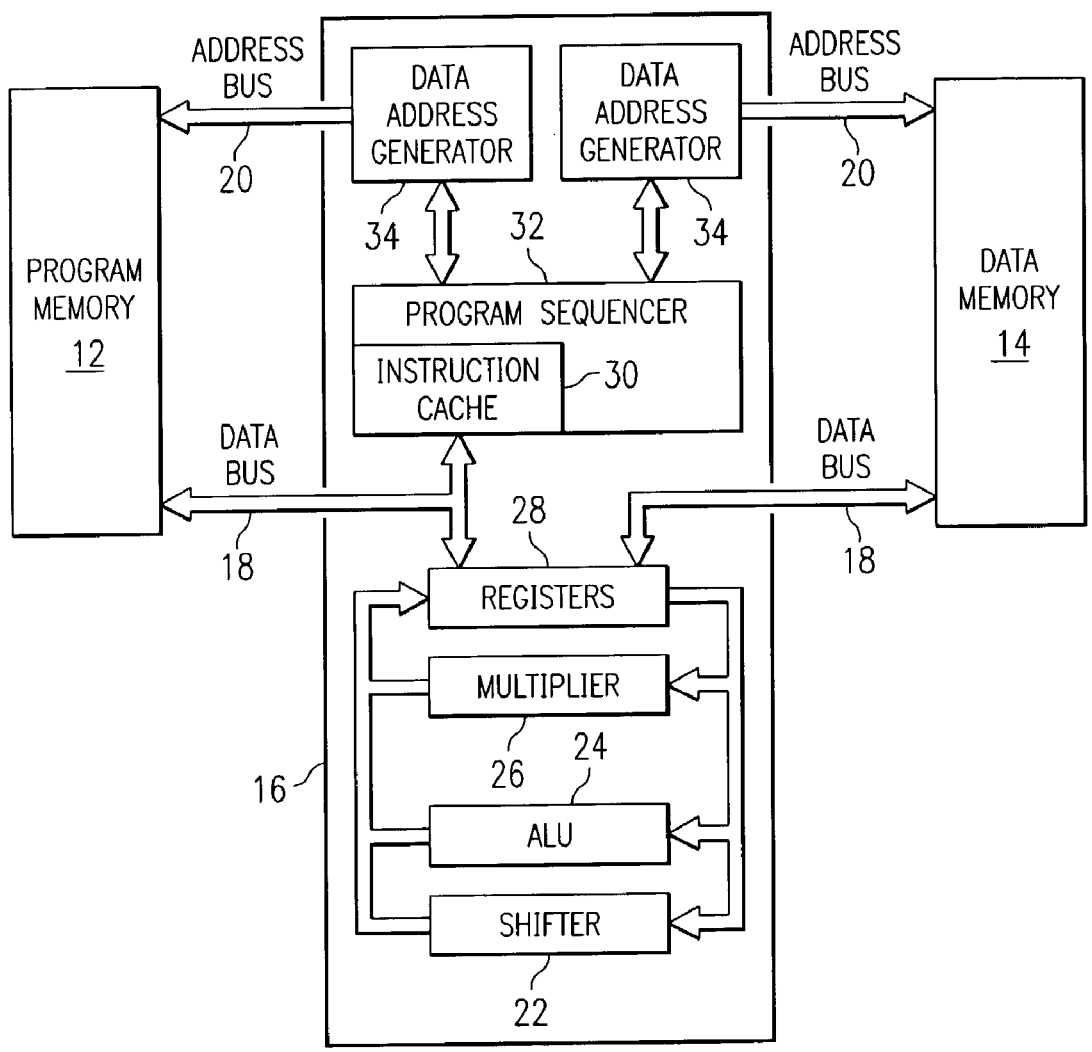
FIG. 1 illustrates an example processor system.

FIG. 1 illustrates an example processor system 10, which may include a digital signal processor (DSP). Although a particular processor system 10 is described and illustrated, the present invention contemplates any suitable processor system 10 including any suitable architecture. Processor system 10 may include program memory 12, data memory 14, and processor 16. Program memory 12 may be used as a medium to store program instructions for operations executed by processor 16, or a processor-based system, and data memory 14 may be used to store data used in operations executed by processor 16 or a processor-based system. Data (which may include program instructions, data used in operations executed by processor 16, or any other suitable data) may be communicated between processor 16 and program memory 12 and between processor 16 and data memory 14 using data buses 18, which may include any suitable physical medium for such communication. For example, data buses 18 may include one or more wires coupling processor 16 to program memory 12 and data memory 14. The number of bits that may be communicated across a data bus 18 in one clock cycle (which may include a unit of time between two adjacent pulses of a clock signal for processor system 10) may be limited. For example, in a 32-bit environment, a maximum of thirty-two bits may be communicated across each data bus 18 in one clock cycle. Data addresses (which may specify locations for data within program memory 12, data memory 14, or elsewhere and may, where appropriate, include the locations themselves) may be communicated between processor 16 and program memory 12 and between processor 16 and data memory 14 using address buses 20, which may include any suitable physical medium for such communication. For example, address buses 20 may include one or more wires coupling processor 16 with program memory 12 and data memory 14. Similar to data buses 18, the number of bits that may be communicated across an address bus 20 in one clock cycle may be limited.

Processor 16 may execute mathematical, logical, and any other suitable operations and may, for example only and not by way of limitation, include one or more shifters 22, arithmetic-logic units (ALUs) 24, multipliers 26, data registers 28, instruction caches 30, program sequencers 32, and data address generators 34. Although a particular processor 16 is described and illustrated, the present invention contemplates any suitable processor 16 including any suitable components. Shifter 22 may be used to left- or right-shift data units and perform other suitable tasks. ALU 24 may be used for addition, subtraction, absolute value operations, logical operations (such as, for example, AND, OR, NAND, NOR, and NOT operations), and other suitable tasks. Multiplier 26 may be used for multiplication and other suitable tasks. In a 32-bit environment, shifter 22, ALU 24, and multiplier 26 may each process a maximum of thirty-two bits in one clock cycle. For example, ALU 24 may in one clock cycle add numbers that include at most thirty-two bits. To add numbers that include more than thirty-two bits, the numbers may be divided into parts that each include thirty-two or fewer bits and added in parts. Registers 28 may include a number of memory locations for storing intermediate operation results, flags for program control, and the like. For example, registers 28 may include one or more general data registers, temporary registers, condition code registers (CCRs), status registers (SRs), address registers, and other suitable registers. In a 32-bit environment, each register 28 may be used to store a maximum of thirty-two bits. Instruction cache 30 may be used to store one or more program instructions for recurring operations. For example, program instructions for one or more operations that are part of a loop of operations executed by processor 16 may be stored using instruction cache 30 such that program memory 12 need not be accessed each time a program instruction for one or more of the operations is to be executed. Program sequencer 32 may direct the execution of operations by processor 16 and perform other suitable tasks. Data address generators 34 may communicate addresses to program memory 12 and data memory 14 specifying memory locations within program memory 12 and data memory 14 from which data may be read and to which data may be written. Although particular components of processor 16 are described as performing particular tasks, any suitable components of processor 16, alone or in combination, may perform any suitable tasks. In addition, although the components of processor 16 are described and illustrated as separate components, any suitable component of processor 16 may be wholly or partly incorporated into one or more other components of processor 16.

Processor system 10 may be used to perform 64-bit scaled sum-of-product operations. In such operations, one 32-bit number may be multiplied by another 32-bit number and the resulting 64-bit product may be right-shifted a particular number of bits and added to a 64-bit number. In a 32-bit environment including 32-bit registers 28, 32-bit ALUs 24, and 32-bit shifters 22, 64-bit scaled sum-of-product operations may be performed in parts. In particular embodiments, such operations may be performed in four parts, each of which may include a single processor operation. Two of the parts may together generate the least significant thirty-two bits of the final result, and two of the parts may together generate the most significant thirty-two bits of the final result. In particular embodiments, as described more fully below, 64-bit scaled sum-of-product operations may alternatively be performed in two parts, each of which may include a single processor operation.

In the first part of a four-part 64-bit scaled sum-of-product operation, a first 32-bit number may be multiplied by a second 32-bit number, the resulting 64-bit product may be right-shifted a particular number of bits, and the least significant thirty-two bits of the right-shifted 64-bit product may be stored. Thus, the first part of a four-part 64-bit scaled sum-of-product operation may be described as follows:

$$P(31:0)=(M(31:0)*X(31:0))>>\text{Scale}$$

M and X may include 32-bit numbers, Scale may include the number of bits by which the 64-bit product of the two 32-bit numbers is right-shifted, and P may include the least significant thirty-two bits of the right-shifted 64-bit product of the two 32-bit numbers.

The first part may, as an example only and not by way of limitation, be implemented using an instruction for which there are four operands, which instruction may be referred to as Integer Multiply Long (IMPYL) and described as follows:

$$\text{IMPYL Reg,SrcA,SrcB,Scale; Reg=(SrcA*SrcB)>>Scale}$$

SrcA and SrcB may include 32-bit numbers and may be stored in registers 28, memory locations within data memory 14, or other suitable locations. Scale may include the number of bits by which the 64-bit product of SrcA and SrcB is right-shifted. Scale may be stored in a register 28 or other suitable location or alternatively include an immediate operand that may be passed to one or more components of processor 16 by the IMPYL instruction. Reg may, after execution of an IMPYL instruction, include the least significant thirty-two bits of the right-shifted 64-bit product of SrcA and SrcB and may be stored in a register 28 or other suitable location. Herein, reference to a particular operand may include the operand itself or, where appropriate, the memory location of the operand. Similarly, reference to a particular memory location may include the memory location itself or, where appropriate, the operand stored at the memory location. When executed, an IMPYL instruction may multiply SrcA by SrcB, right-shift the resulting product by Scale bits (which shift may include a logical shift), and store the least significant thirty-two bits of the right-shifted product.

Figure 2:
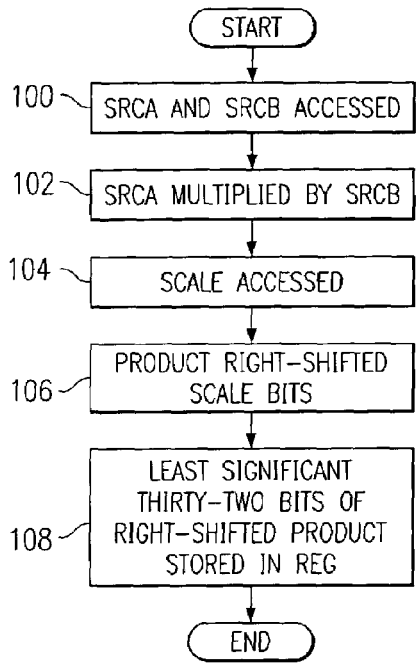
FIG. 2 illustrates execution of an example IMPYL instruction.

FIG. 2 illustrates execution of an example IMPYL instruction. Execution of the instruction may begin at step 100, where SrcA and SrcB are accessed. At step 102, SrcA is multiplied by SrcB, resulting in a 64-bit product. At step 104, Scale is accessed. As described above, Scale may include an immediate operand and may thus be passed to one or more components of processor 16 by the IMPYL instruction. At step 106, the 64-bit product from step 102 is right-shifted by Scale bits. At step 108, the least significant thirty-two bits of the right-shifted product of SrcA and SrcB is stored in Reg, at which point execution of the IMPYL instruction may end.

In the second part of a four-part 64-bit scaled sum-of-product operation, the least significant thirty-two bits of the right-shifted product of the two 32-bit numbers may be added to the least significant thirty-two bits of a 64-bit number, which addition may include an unsigned addition. The resulting sum may include the least significant thirty-two bits of the final result of the 64-bit scaled sum-of-product operation and, potentially, a carry bit. The least significant thirty-two bits of the final result of the 64-bit scaled sum-of-product operation and generated carry bit (if a carry was generated) may be stored. Thus, the second part of a four-part 64-bit scaled sum-of-product operation may be described as follows:

Carry:$Y(31:0)=B(31:0)+P(31:0)$

B may include the least significant thirty-two bits of the 64-bit number, and P may include the least significant thirty-two bits of the right-shifted 64-bit product of the two 32-bit numbers. Y may include the least significant thirty-two bits of the final result of the 64-bit scaled sum-of-product operation. Carry may include a carry bit (which may include a bit more significant than the most significant bit of the least significant thirty-two bits of the final result).

The second part may, as an example only and not by way of limitation, be implemented using an instruction for which there are two operands, which instruction may be referred to as Add Unsigned Long (ADDUL) and described as follows:

| ADDUL | Reg,SrcC | ; Reg = Reg + SrcC (unsigned) ; Set C if carry generated |
|---|---|---|

SrcC may include the least significant thirty-two bits of the 64-bit number and may be stored in a register 28, a memory location within data memory 14, or another suitable location. Reg may, at the outset of the execution of an ADDUL instruction, include the least significant thirty-two bits of a right-shifted 64-bit product of the two 32-bit numbers from execution of the preceding IMPYL instruction and may, after the execution of the ADDUL instruction, include the least significant thirty-two bits of the final result of the 64-bit scaled sum-of-product operation. Reg may be stored in a register 28 or other suitable location. C may include a carry bit and may stored in a status register 28.

Figure 3:
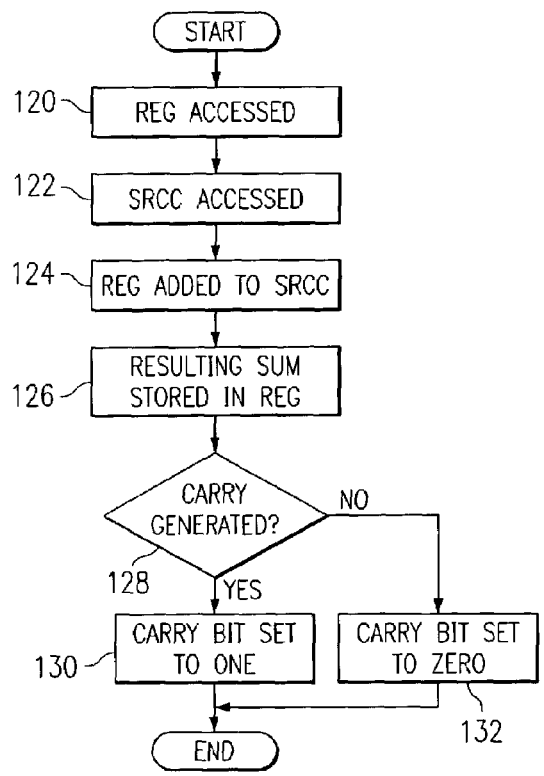
FIG. 3 illustrates execution of an example ADDUL operation.

FIG. 3 illustrates execution of an example ADDUL instruction. Execution may begin at step 120, where Reg is accessed. As described above, Reg may, at the outset of the execution of the ADDUL instruction, include the least significant thirty-two bits of the right-shifted 64-bit product of the two 32-bit numbers from execution of the preceding IMPYL instruction. At step 122, SrcC is accessed. At step 124, Reg is added to SrcC. At step 126, the resulting sum of Reg and SrcC is stored in Reg. At step 128, if the addition of Reg to SrcC generated a carry, execution of the ADDUL instruction proceeds to step 130. At step 130, a carry bit may be set to one, at which point the method may end. The carry bit may be stored in a status register 28. At step 128, if the addition of Reg to SrcC did not generate a carry, execution of the ADDUL proceeds to step 132. At step 132, the carry bit may be set to zero, at which point execution of the ADDUL instruction may end.

In the third part of a four-part 64-bit scaled sum-of-product operation, the first 32-bit number may again be multiplied by the second 32-bit number and the resulting product may be right shifted thirty-two bits and stored. Thus, the third part of a four-part 64-bit scaled sum-of-product operation may be described as follows:

$P(31:0)=(M(31:0)*X(31:0))>>32$

M and X may, as described above, include 32-bit numbers, and P may include the most significant thirty-two bits of the 64-bit product of the two 32-bit numbers. The second part may, as an example only and not by way of limitation, be implemented using an instruction for which there are three operands, which instruction may be referred to as QMPYL and described as follows:

QMPYL Reg,SrcA,SrcB; Reg=(SrcA*SrcB)>>32

Figure 4:
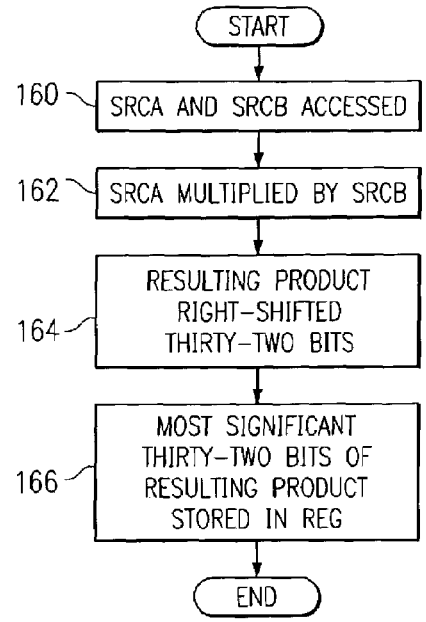
FIG. 4 illustrates execution of an example QMPYL operation.

SrcA and SrcB, as described above, may include 32-bit numbers and may be stored in registers 28, memory locations within data memory 14, or other suitable locations. Reg may, after execution of a QMPYL instruction, include the most significant thirty-two bits of the 64-bit product of SrcA and SrcB and may be stored in a register 28 or other suitable location. When executed, a QMPYL instruction may multiply SrcA by SrcB, right-shift the resulting product by thirty-two bits, and store the most significant thirty-two bits of the 64-bit product. FIG. 4 illustrates execution of an example QMPYL instruction. Execution of the instruction may begin at step 160, where SrcA and SrcB are accessed. At step 162, SrcA is multiplied by SrcB, resulting in a 64-bit product. At step 164, the 64-bit product from step 102 is right-shifted by thirty-two bits. At step 166, the most significant thirty-two bits of the product of SrcA and SrcB is stored in Reg, at which point execution of the QMPYL instruction may end.

In the fourth part of a four-part 64-bit scale sum-of-product operation, the most significant thirty-two bits of the 64-bit product of the two 32-bit numbers may be right-shifted by a particular number of bits. The most significant thirty-two bits of the 64-bit number and a carry bit from execution of the preceding QMPYL instruction (if a carry was generated) may subsequently be added to the right-shifted most significant thirty-two bits of the 64-bit product of the two 32-bit numbers, and the resulting sum may be stored. The resulting sum may include the most significant thirty-two bits of the final result of the 64-bit scales sum-of-product operation. Thus, the fourth part of a four-part 64-bit scaled sum-of-product operation may be described as follows:

$Y(63:32)=B(63:32)+(P(31:0)>>Scale)+Carry$

B may include the most significant thirty-two bits of the 64-bit number, and P may include the most significant thirty-two bits of the 64-bit product of the two 32-bit numbers. Scale may include the number of bits by which the most significant thirty-two bits of the 64-bit product of the two 32-bit numbers is right-shifted. Y may include the most significant thirty-two bits of the final result of the 64-bit scaled sum-of-product operation. Carry may include a carry bit generated by the addition, in the preceding second part of the 64-bit scaled sum-of-product operation, of the least significant thirty-two bits of the 64-bit product of the two 32-bit numbers to the least significant thirty-two bits of the 64-bit number.

The fourth part may, as an example only and not by way of limitation, be implemented using an instruction for which there are three operands, which instruction may be referred to as Add Carry Long (ADDCL) and described as follows:

ADDCL Reg,SrcD,Scale; Reg=(Reg>>Scale)+SrcD+C

SrcD may include the most significant thirty-two bits of the 64-bit number and may be stored in a register 28, a memory location within data memory 14, or another suitable location. C may include a carry bit from execution of the preceding ADDUL instruction generated by the addition of the least significant thirty-two bits of the 64-bit product of the two 32-bit numbers to the least significant thirty-two bits of the 64-bit number. As described above, C may be stored in a status register or other suitable location. Scale may include the number of bits by which Reg is right-shifted and may be stored in a register 28 or other suitable location or alternatively include an immediate operand. Reg may, at the outset of the execution of an ADDCL instruction, include the most significant thirty-two bits of the 64-bit product of the two 32-bit numbers from execution of the preceding QMPYL instruction and may, after the execution of the ADDCL instruction, include the most significant thirty-two bits of the final result of the 64-bit scaled sum-of-product operation. Reg may be stored in a register 28 or other suitable location. When executed, a QMPYL instruction may right-shift Reg a particular number of bits (which shift may include an arithmetic shift), add SrcD and C to Reg, and store the resulting sum.

Figure 5:
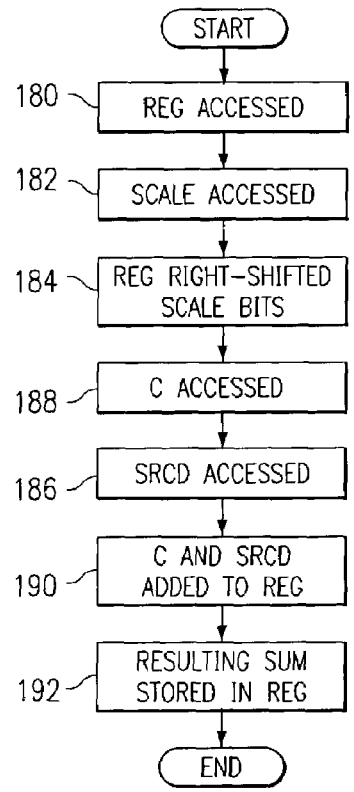
FIG. 5 illustrates execution of an example ADDCL operation.

FIG. 5 illustrates execution of an example ADDCL instruction. Execution may begin at step 180, where Reg may be accessed. As described above, Reg may, at the outset of the execution of the ADDCL instruction, include the most significant thirty-two bits of the 64-bit product of the two 32-bit numbers from execution of the preceding IMPYL instruction. At step 182, Scale may be accessed. As described above, Scale may include an immediate operand and may thus be passed to one or more components of processor 16 by the ADDCL instruction. At step 184, Reg may be right-shifted by Scale bits, which shift may include an arithmetic shift. At step 186, C may be accessed. As described above, C may include a carry bit from execution of the preceding ADDUL instruction. At step 188, SrcD may be accessed. At step 190, C and SrcD may be added to Reg. At step 192, the resulting sum may be stored in Reg, at which point execution of the ADDCL instruction may end.

As an example only and not by way of limitation, the instructions IMPYL, ADDUL, QMPYL, and ADDCL may together be used to implement a linear equation of the form Y=B+((M*X)>>Scale) as follows. Y and B may include 64-bit numbers, M and X may include 32-bit numbers, and Scale may include the number of bits by which the product of M and x is right-shifted.

```
         MOV   RegB,#Scale          ; Initialize scale value
; Calculate low part
IMPYL    RegA,@M,@X,RegB             ; RegA = (M * X) >> RegB
ADDUL    RegA, @Blow                 ; RegA = RegA + Blow
MOVL     @Ylow,RegA                  ; Ylow = RegA
; Calculate high part
QMPYL    RegA,@M,@X                  ; RegA = (M * X) >> 32
MOVL     RegC,@Bhigh                 ; RegC = Bhigh
ADDCL    RegC,RegA,RegB              ; RegC = RegC + (RegA >> RegB)
MOVL     @Yhigh,RegC                 ; Yhigh = RegC
```

As an alternative to performing 64-bit scaled sum-of-product operations in four parts, such operations may in particular embodiments be performed in two operations, each of which may include a single processor operation. For example, the first and second parts described above may be combined into a single operation and the third and fourth parts described above may be combined into a single operation. Such operations may be repeatable and may provide for the efficient implementation of multiple sum-of-product algorithms. As an example only and not by way of limitation, the first and second parts and the third and fourth parts may be implemented, respectively, using the following instructions:

```
IMACL  Reg,SrcA,SrcB,Scale     ; First and second parts
QMACL  Reg,SrcA,SrcB,Scale     ; Third and fourth parts
```

These instructions may in one or more ways resemble Multiply and Accumulate (MAC) instructions typically supported by DSP devices, but may differ from such instructions in that IMACL and QMACL may in combination carry out the addition of a 64-bit number to a scaled product of two 32-bit numbers.

Particular embodiments of the present invention may provide one or more technical advantages. Particular embodiments may perform 64-bit scaled sum of product operations using a 32-bit adder instead of a 64-bit adder. In particular embodiments, scaling operations may be performed in conjunction with sum-of-product operations. Particular embodiments may use a minimal amount of circuitry, decrease time requirements associated with 64-bit scaled sum of product operations, increase silicon efficiency, or improve processor performance. Certain embodiments may provide all, some, or none of these technical advantages, and certain embodiments may provide one or more other technical advantages.

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer implemented method of performing a 64-bit scaled sum-of-product operation in a 32-bit environment comprising the steps of:

storing a first 32-bit number in a first data register of a set of data registers;

storing a second 32-bit number in a second data register of said set of data registers;

storing 32 least significant bits of a 64-bit sum of products in a third data register of said set of data registers;

storing 32 most significant bits of said 64-bit sum of products in a fourth data register in said set of data registers;

in response to an integer multiply long instruction multiplying said first 32-bit number by said second 32-bit number producing a first product in an arithmetic logic unit, right shifting said first product by an instruction specified shift amount and storing 32 least significant bits of said shifted first product in a fifth data register of said set of data registers;

in response to an add unsigned long instruction adding said shifted first product stored in said fifth data register to said 32 least significant bits of said 64-bit sum of products stored in said third data register producing a first sum in said arithmetic logic unit, setting a carry bit in said arithmetic logic unit to 1 if said adding generated a carry and to 0 if said adding did not generate a carry;

in response to a QMPLY instruction multiplying said first 32-bit number by said second 32-bit number producing a second product in an arithmetic logic unit, and storing 32 most significant bits of said second product in said fifth data register of said set of data registers; and in response to a add carry long instruction shifting said second product stored in said fifth data register by said instruction specified shift amount and adding said shifted second product and said carry bit to said 32 most significant bits of said 64-bit sum of products stored in said fourth data register producing a second sum in said arithmetic logic unit, and storing said second sum in said fourth data register.

2. The computer implemented method of claim 1, wherein: said integer multiply long instruction and said add carry long instruction each specify said shift amount via an immediate operand.

3. The computer implemented method of claim 1, wherein: storing a shift amount in a sixth data register of said set of data registers; and said integer multiply long instruction and said add carry long instruction each specify said shift amount by reference to said sixth data register of said set of data registers.

4. A computer implemented method of performing a 64-bit scaled sum-of-product operation in a 32-bit environment comprising the steps of:

storing a first 32-bit number in a first data register of a set of data registers;

storing a second 32-bit number in a second data register of said set of data registers;

storing 32 least significant bits of a 64-bit sum of products in a third data register of said set of data registers;

storing 32 most significant bits of said 64-bit sum of products in a fourth data register in said set of data registers;

in response to an IMACL instruction multiplying said first 32-bit number by said second 32-bit number producing a first product in an arithmetic logic unit, right shifting said first product by an instruction specified shift amount, adding 32 least significant bits of said shifted first product to said 32 least significant bits of said 64-bit sum of products stored in said third data register producing a first sum in said arithmetic logic unit, setting a carry bit in said arithmetic logic unit to 1 if said adding generated a carry and to 0 if said adding did not generate a carry;

in response to a QMACL instruction multiplying said first 32-bit number by said second 32-bit number producing a second product in an arithmetic logic unit, adding 32 most significant bits of said second product and said carry bit to said 32 most significant bits of said 64-bit sum of products stored in said fourth data register producing a second sum in said arithmetic logic unit, and storing said second sum in said fourth data register.

5. The computer implemented method of claim 4, wherein:
said IMACL instruction and said QMACL instruction each specify said shift amount via an immediate operand.

6. The computer implemented method of claim 4, wherein:
storing a shift amount in a fifth data register of said set of data registers; and
said IMACL instruction and said QMACL instruction each specify said shift amount by reference to said fifth data register of said set of data registers.

\* \* \* \* \*

UNITED STATES PATENT AND TRADEMARK OFFICE
CERTIFICATE OF CORRECTION

PATENT NO.         : 7,580,968 B2                                                      Page 1 of 1
APPLICATION NO. : 10/349344
DATED              : August 25, 2009
INVENTOR(S)        : Alexander Tessarolo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Fourteenth Day of September, 2010

David J. Kappos
*Director of the United States Patent and Trademark Office*